United States Patent [19]

Kuroda et al.

[11] 4,234,866
[45] Nov. 18, 1980

[54] CENTRALIZED ALARM SYSTEM FOR VEHICLES

[75] Inventors: Masahiko Kuroda, Chigasaki; Eiji Ohsawa, Ebina, both of Japan

[73] Assignee: Nissan Shatai Co., Ltd., Japan

[21] Appl. No.: 956,788

[22] Filed: Nov. 1, 1978

[30] Foreign Application Priority Data

Dec. 26, 1977 [JP] Japan .................................. 52-155635

[51] Int. Cl.$^2$ ............................................. G08B 19/00
[52] U.S. Cl. ................................... 340/52 F; 340/521
[58] Field of Search ................. 340/52 F, 286 M, 515, 340/517, 518, 521, 519

[56] References Cited

U.S. PATENT DOCUMENTS

| | | | |
|---|---|---|---|
| 3,839,701 | 10/1974 | Pomerantz | 340/518 |
| 3,964,302 | 6/1976 | Gordon et al. | 340/518 |
| 4,149,155 | 4/1979 | Kishi et al. | 340/52 F |

OTHER PUBLICATIONS

Seymour, "Car Systems Monitor", Mar. 1977, pp. 210, 211, 212.

Primary Examiner—Alvin H. Waring

Attorney, Agent, or Firm—McGlew and Tuttle

[57] ABSTRACT

A centralized alarm sytem for warning of abnormalities in a plurality of components, in particular, for a vehicle, comprising, a plurality of sensors, each associated with a component for producing an abnormality signal when the associated component becomes abnormal, a control circuit connected to each of the sensors for producing a main indication signal when any one of the sensors produces an abnormality signal and for producing a local indication signal for each sensor producing an abnormality signal, and a plurality of local indicators, each associated with one of the sensors and connected to the control circuit being capable of producing a perceptable indication when an associated one of the sensors produces an abnormality signal. A main indicator is also connected to the control circuit for producing a perceptable indication when a main indication signal is produced by the control circuit with the control circuit including a systems check device for turning the main indicator on when a main indicator is produced in the control circuit. The control circuit also includes a component checking device for permitting individual activation of each local indicator when a corresponding local indication signal is produced.

42 Claims, 7 Drawing Figures

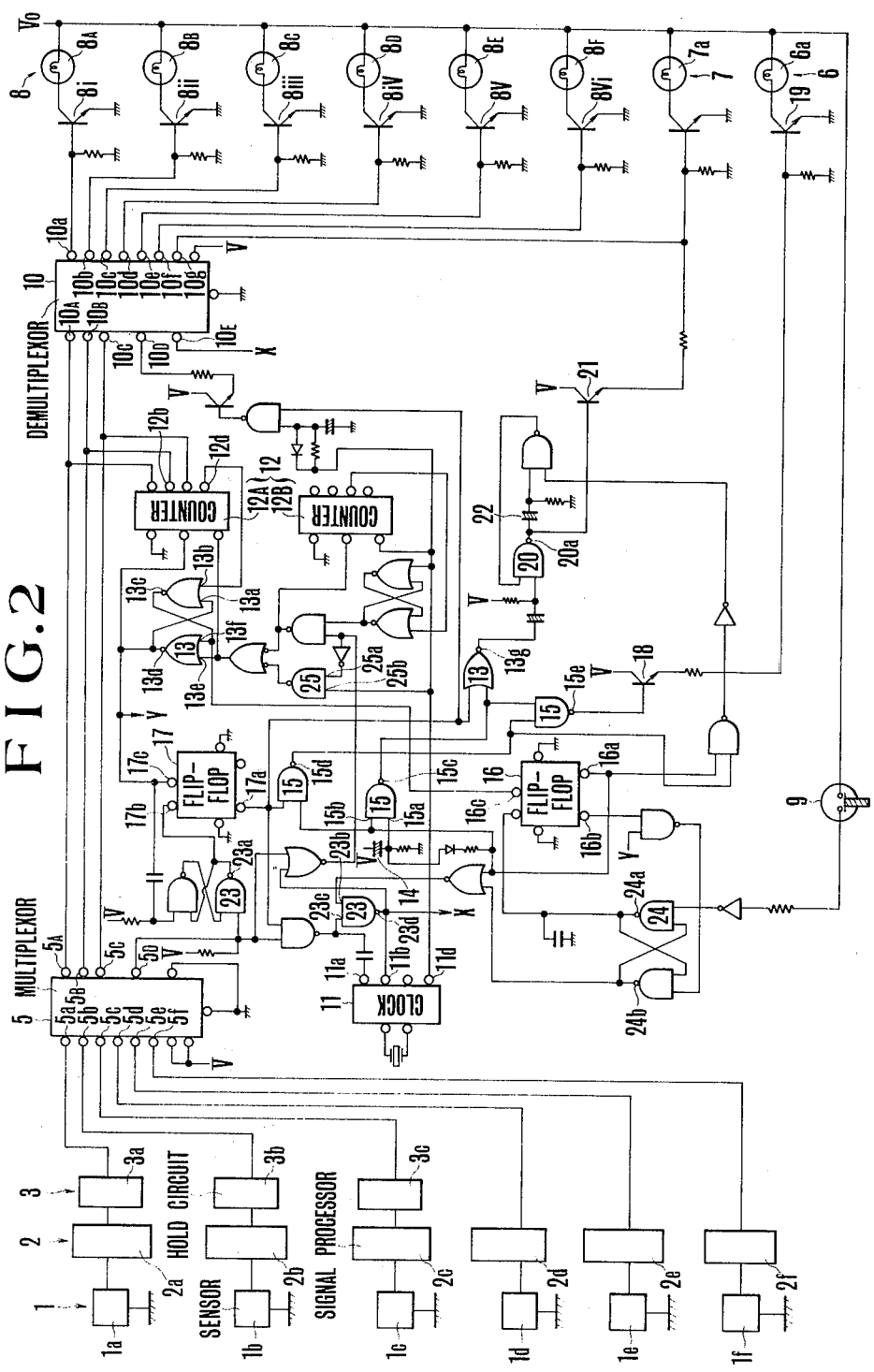

FIG.3(a)
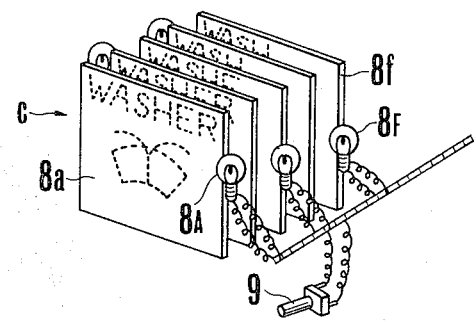
FIG.3(b)
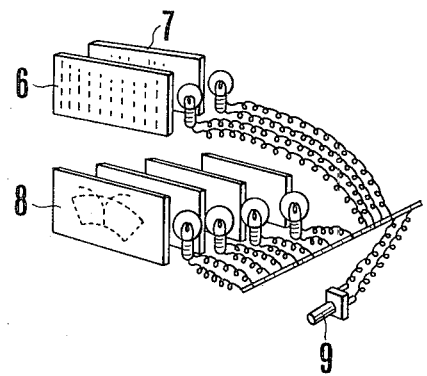
FIG.3(c)
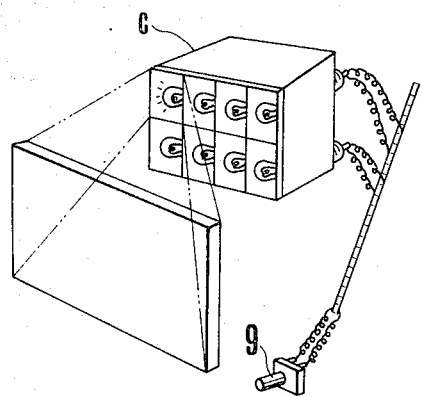
FIG.4    FIG.5
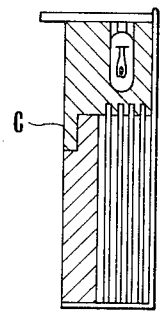 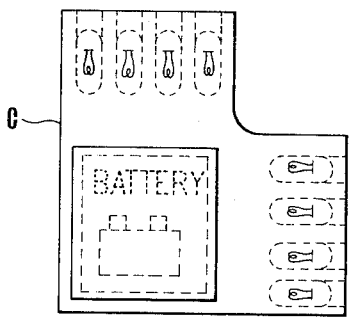

CENTRALIZED ALARM SYSTEM FOR VEHICLES

FIELD AND BACKGROUND OF THE INVENTION

This invention relates to a new and useful centralized alarm system for vehicles, particularly motor vehicles, which checks parts, functions or supplies related to the driving safety of the vehicle to see if they are in the normal state or require replacement or replenishment and, if there is any abnormality, gives notice and warning to the driver in a centralized fashion.

DESCRIPTION OF THE PRIOR ART

Various types of centralized alarms systems for use in motor vehicles have heretofore been proposed. In one example, alarm lamps are provided which correspond in number to the detecting elements or sensors for detecting the conditions of the various parts of the vehicle, their functions, etc. This example, however, has disadvantages in that a plurality of alarm lamps make it necessary for the indicating section to occupy a wide area. It is troublesome for the driver to examine a plurality of alarm lamps which may be lit simultaneously and it is difficult to provide the indicating section at a position most suitable for the driver to see because the indicating section requires a wide area and, therefore, the driver tends to overlook the warning.

In another example which is intended to eliminate the above-mentioned disadvantages, an alarm-indicating window for giving a plurality of warnings or alarms is provided. In this example, an order of priority is appointed to the parts of the vehicle, their functions or the like (associated with driving safety) according to their order of importance. When a plurality of abnormalities occur, they are indicated and removed one by one in the order of priority. In this example, however, all of a plurality of abnormalities cannot be known at the same time. Therefore, in some modes of use of the vehicle in which the above-mentioned order of priority is reversed or not appropriate, the abnormality of a lower ranking part which does not require immediate repair is indicated first and that of a more important part is not found and indicated immediately.

In view of these circumstances, the present invention is intended to eliminate the above-mentioned disadvantages of the prior art.

SUMMARY OF THE INVENTION

Accordingly, an object of the invention is to provide a centralized alarm system for vehicles, which can give a collective alarm for the occurrence of abnormalities of the parts, functions or supplies of a vehicle by providing a main alarm device, thereby, saving the trouble of giving separate alarms therefor. A command can be given as necessary by the use of a check switch provided, for successively indicating or identifying the abnormal parts and the like.

Another object of the present invention is to provide a centralized alarm system for vehicles, which can inform, by the use of an OK-indicator, that the parts, functions or supplies associated with the driving safety of a vehicle are in the normal state, and can give a command as necessary, by the use of a check switch, to successively indicate or identify the parts and the like that have been checked and to then turn the OK-indicator on again.

A further object of the present invention is to provide a centralized alarm system for vehicles, which has an indicating window collectively containing a main alarm device, an OK-indicator, and various indicators, corresponding to parts, functions or supplies to be inspected.

Another object of the invention is to provide a centralized alarm system for vehicles, in which the above-mentioned OK-indicator is actuated when the engine starts, and to successively indicate and identify the inspected parts or the like by a command issued by the operation of the check switch even while traveling in the vehicle. The system can also operate the main alarm device to give an alarm when any abnormality occurs on parts or the like and can operate the check switch to identify abnormal parts or the like during starting of the engine or traveling in the vehicle.

Yet another object of the invention is to provide a centralized alarm system for vehicles, which can check to see if the main alarm device funtions properly when the engine starts.

Still another object of the present invention is to provide a centralized alarm device for vehicles, which can identify abnormal parts or the like by a flickering indication.

Another object of the present invention is to provide a centralized alarm device for vehicles, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 2 is a schematic diagram of a circuit used in accordance with the embodiment shown in FIG. 1;

FIG. 3a is a top perspective view of a display configuration for one embodiment of the invention;

FIG. 3b is a configuration for the display of another embodiment of the invention;

FIG. 3c is a configuration of the display in a still further embodiment of the invention;

FIG. 4 is a side elevational view of the embodiment shown in FIG. 3a; and

FIG. 5 is a front elevational view of the embodiment shown in FIG. 4.

DESCRIPTION OF THE PREFERRED EMBODIMENTS

Figure 1:
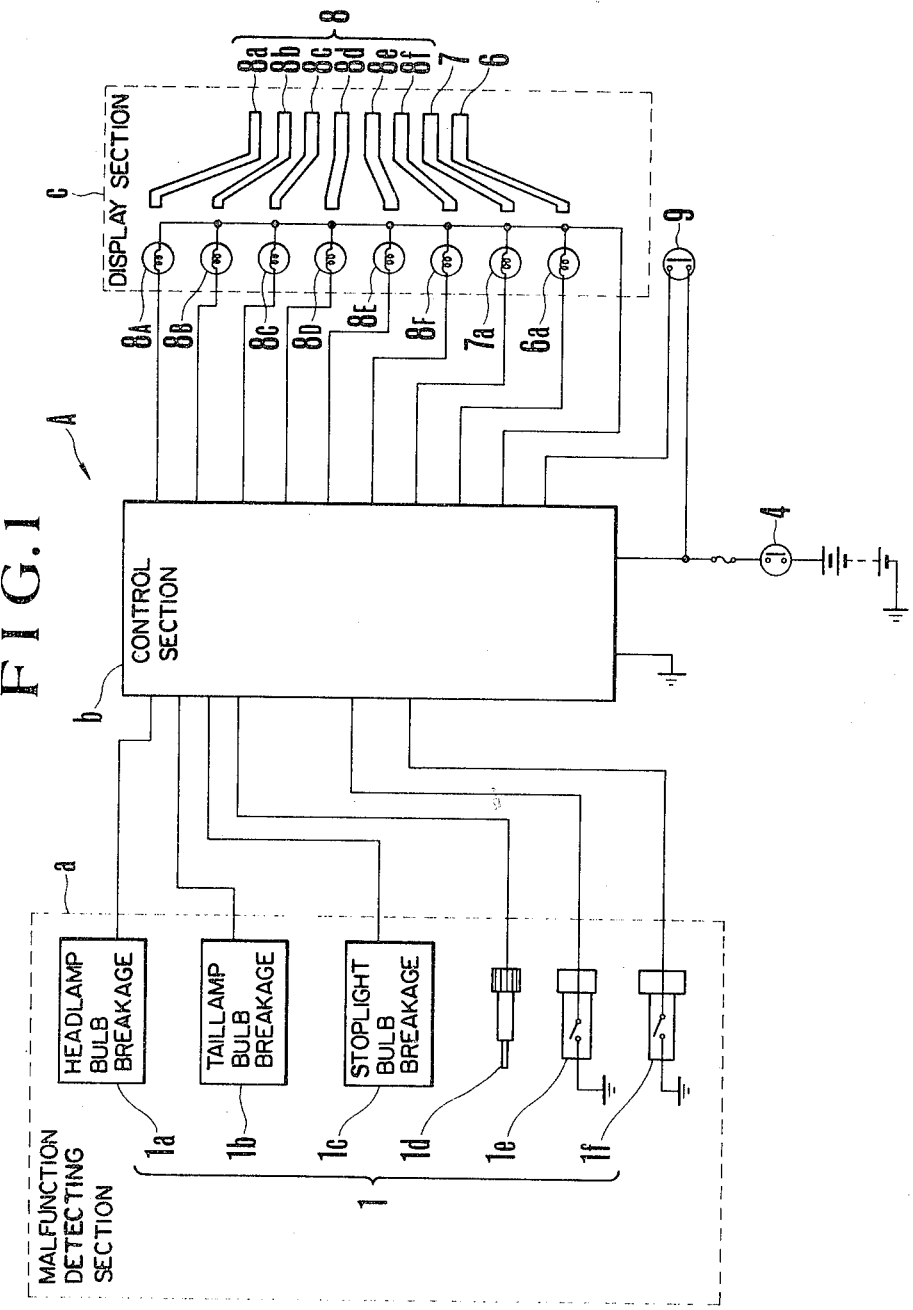
FIG. 1 is a block diagram and schematic representation for the overall configuration of the invention.

Referring now to the drawings in particular, the invention embodied therein in FIG. 1, comprises a centralized alarm system, generally designated A having a malfunction detecting section a, a control section b and an indicating or display section c. Detecting section a has sensors 1 connected to or associated with components or various parts in the vehicle to be inspected, so that abnormalities of the inspected regions of these parts may be converted into an information or signal in the form of voltage variations.

The sensors include, for example, a headlamp bulb breakage sensor 1a, a tail lamp bulb breakage sensor 1b, a stoplight bulb breakage sensor 1c, a battery liquid level sensor 1d, a washer liquid level sensor 1e, and a radiator liquid level sensor 1f. As seen in FIG. 2, the detecting section a also has signal processors 2a to 2f connected to the respective sensors 1a to 1f, and adapted to convert signals from the sensors 1 into stable voltage signals.

In addition, the detecting section a has holding circuits 3a to 3c provided at the respective bulb breakage sensors 1a, 1b and 1c and adapted to hold an abnormality indication signal once it is received until the engine key 4 is set to OFF. The signal processors 2 produce low or L-level signals if abnormalities are found in the respective parts inspected, and produce high or H-level signals if no abnormality is found therein. These L- or H-level signals are transmitted to a multiplexor 5 in the control section b.

The indicating section c is composed of a main alarm device or indicator 6, an OK-indicator 7, and local alarm devices or indicators 8. The main alarm device 6 gives an alarm, for instance, by turning on a red light, if at least one part which has been inspected is found to be abnormal. The OK-indicator 7 gives a signal if all of the parts which have been inspected are found to be normal. The local alarm devices 8 give information on the respective parts inspected, and include devices 8a to 8f provided with colors, pictures, characters or the like according to the corresponding parts and the like so as to be easily distinguished from one another, as shown in FIGS. 3a, 3b and 3c. These local alarm devices 8a to 8f are adapted to successively give signals by depressing a check switch 9.

The multiplexor 5 successively scans for signals at terminals 5a to 5f which are transmitted from the signal processors 2, according to binary mode signals received through terminals 5A to 5C. Terminal 5D gives out an L-signal if any abnormality is found, and an H-signal if no abnormality is found.

Reference number 10 designates a demultiplexor which, according to binary mode signals which are input to terminals 10A through 10C in synchronization with those for the multiplexor 5, makes a potential, received at terminal 10D, appear as outputs at terminals 10a to 10f. When these output signals are H-signals, transistors $8_i$ to $8_{vi}$ of the local alarm devices 8 are turned on and thereby turn on lamps or lights 8A to 8F corresponding to the terminals 10a to 10f.

A control terminal 10E is provided in the demultiplexor 10. If an H-signal is applied to the terminal 10E, H-signals do not appear on the terminals 10a to 10f, even if an H-signal is applied to the terminal 10D.

A clock pulse generator 11, which generates from the terminal 11d thereof 5/2 Hz pulses when an H-signal is input to the terminal 11b thereof, and 1 Hz pulses when an L-signal is input to the terminal 11b. When an L-signal is applied to the terminal 11a, the output of terminal 11d becomes 0.

Binary counters 12 which produce binary mode signals according to the output of the clock pulse generator 11, thereby scanning the multiplexor 5 and controlling the output level of the demultiplexor 10.

The binary counters 12 include two counters 12A and 12B. The terminal 12d of the binary counter 12A and the terminals 13a to 13f of an integrated circuit 13 cooperatively form an octal counter, and thereby, the integrated circuit 13 generates from its terminal 13d one pulse signal for every eight clock pulses output from the pulse generator 11. In a similar manner, the binary counter 12B forms a quaternary counter and, thereby, flickers a lamp or lamps four times which correspond to the inspected parts found to be abnormal among the lamps 8A to 8F by the aid of the operation or actuation of the check switch 9.

The operation of the centralized alarm system of the present invention performed when the engine switch 4 is in the ON position will be hereinafter described.

When the engine switch 4 is turned on, an H-signal appears on a terminal 15a of NAND-circuits 15 through a capacitor 14 and on a terminal 15b of the circuits 15 through a D-type flip-flop circuit 16, and an L-signal appears on a terminal 15c of the circuits 15.

If, for instance, all of the signals from the detecting section a are normal, that is, if an H-signal appears on the terminal 5D of the multiplexor 5, a terminal 23a of an integrated circuit 23 will generate an L-signal, a terminal 17a of another D-type flip-flop circuit 17 will generate an L-signal, a terminal 15d of the NAND-circuits 15 will generate an H-signal, and a terminal 15e of the NAND-circuits 15 will generate an H-signal. In this condition, transistors 18 and 19 are turned on to light a red lamp or light 6a of the main alarm device 6. Thus, it can be confirmed that the main alarm device 6 is properly turned on.

In the above-mentioned condition, the demultiplexor 10 receives an H-signal at its terminal 10E and therefore generates no H-signal from its terminals 10a to 10g. Terminals marked as "X", "V" and "Y" are connected to each other respectively so that terminal 10E receives the H-signal from output 23d of integrated circuit 23. Consequently, the lamp 7a of the OK-indicator 7 and lamps 8A to 8F are not turned on. In addition, an integrated circuit 20 generates an L-signal from its terminal 20a and therefore a transistor 21 is not turned on. As a result, the OK-indicator lamp 7a is still kept turned off.

After about 4 seconds, the capacitor 14 is recharged and an L-signal therefore appears on the terminal 15a of the NAND-circuits 15. As a result, an H-signal appears on the terminal 15c of the NAND circuits 15 to turn off the transistors 18 and 19 and therefore the red lamp 6a. At the same time, an H-signal appears on the terminal 13g of integrated circuits 13 to turn the transistor 21 on and to thereby turn on the OK-indicator lamp 7a.

When capacitor 22 is charged, an L-signal is again generated from the terminal 20a of the integrated circuit 20 to turn off the OK-indicator lamp 7a. Thus, the main alarm device 6, the OK-indicator device 7 and the local alarm devices 8 are all turned off.

System checking means are thus included in the device which comprise the NAND circuits 15, flip-flops 16 and 17, circuits 23 and transistors 18 and 19. This system checking means thus turns indicator 6 on for about four seconds as determined by capacitor 14, then through additional components, namely, capacitor 22 and integrated circuit 20, turns the OK-indicator on for a few seconds.

On the other hand, if any abnormality is detected by the detecting section a and an L-signal therefore appears on the corresponding terminal or terminals among the terminals 5a to 5f of the multiplexor 5, an L-signal will appear on the terminal 5D of the multiplexor 5 when the above mentioned terminal or terminals are scanned. As a result, the signal generated from terminal 23a of the integrated circuits 23 is changed from an L-signal to an H-signal. The H-signal from the terminal 23a is fed to terminal 17b of the D-type flip-flop circuit 17 and an H-signal thereby appears on the terminal 17a in synchronization with the clock pulse input to the terminal 17c. At this time, terminal 23a of integrated circuits 23 generates an L-signal in synchronization with the clock pulse of the terminal 13d of the integrated circuits 13. However, the terminal 17a of the D-type flip-flop circuit 17 still generates an H-signal. Consequently, terminal 15d of NAND circuits 15 generates an L-signal and an H-signal is thereby generated from terminal 15e of NAND circuits 15. As a result, the red lamp 6a of the main alarm device 6 is kept turned on.

If, in this condition, abnormality signals are generated from the bulb breakage sensors 1a to 1c, they are held as they are by the holding circuits 3a to 3c and, therefore, the red lamp 6a of the main alarm device 6 is kept turned on until the engine key is set to OFF even if the sensor section 1 comes to generate signals indicative of normal conditions. If, on the other hand, abnormality signals are generated from the other sensors 1d to 1f, having no holding circuit, an H-signal is generated from the terminal 5D of the multiplexor 5 whenever the sensor section 1 returns to a normal condition and, therefore, an L-signal is generated from the terminal 23a of the integrated circuits 23. As a result, terminal 17a of the D-type flip-flop circuit 17 generates an L-signal in synchronization with the clock pulse input to the terminal 17c and red lamp 6a of main alarm device 6 is thereby turned off.

If check switch 9 is closed when the red lamp 6a of main alarm device 6 is kept lit because of the occurrence of abnormalities, the output of the terminal 24a of integrated circuits 24 is changed from an L-signal to an H-signal, and that of terminal 24b is changed from an H-signal to an L-signal.

In addition, the output of terminal 16a of the D-type flip-flop circuit 16 is changed from an H-signal to an L-signal, and that of terminal 16b is changed from an L-signal to an H-signal in synchronization with the clock pulse of terminal 16c. As a result, terminal 15d of NAND-circuits 15 generates an H-signal and the red lamp 6a is therefore turned off. Additionally, an H-signal appears on terminal 23b of integrated circuits 23, and also on terminal 23c when an abnormality-related terminal among the terminals 5a to 5f of multiplexor 5 is scanned. As a result, the terminal 23d of intergrated circuits 23 generates an L-signal. Thus, terminal 10D of demultiplexor 10 is connected to terminals 10a to 10g thereof, and the clock pulse generator 11 produces clock pulses having a repetition rate of 1 Hz.

At this time, terminal 25a of integrated circuit 25 has an H-signal, and terminal 25b thereof suspends transmission of the clock pulses. Thus, the scanning of multiplexor 5 is suspended until the 1-Hz signal is applied to terminal 10D of demultiplexor 10 four times by the binary counter 12B. As a result, the lamp corresponding to an abnormal portion has been flickered four times. After the four flickering operations, the binary counter 12A generates the next binary signal for the next scanning.

If the next terminal of multiplexor 5 indicates an abnormality, the corresponding lamp is flickered four times in the same manner. However, if no abnormality is indicated, the operation proceeds to the next scanning. After all of terminals 5a to 5f are scanned, output pulse signals from the terminals 13c and 13d of integrated circuits 13 return both of the D-type flip-flop circuit 16 and integrated circuits 24 to the original state where the red lamp 6a is lit. The check switch 9 and circuitry 24 thereby comprise component checking means which initiate the scanning of the multiplexor 5 and the demultiplexor 10 to display the lamp 8a through 8f which corresponds to an abnormal component.

On the other hand, if the check switch 9 is depressed when there is no abnormality and therefore the lamps 6a, 7a and 8A to 8F are all off, operations will be as follows:

Terminal 23c of integrated circuit 23 has an H-signal, and terminal 23b thereof has an H-signal in synchronization with a pulse signal appearing on the terminal 11d and which informs of the start of the scanning of multiplexor 5. As a result, terminal 23d of integrated circuits 23 generates an L-signal. Thus, clock pulse generator 11 generates 1-Hz clock pulses from its terminal 11d, and terminal 10E of demultiplexor 10 has an L-signal. Consequently, lamps 8A to 8F of the local alarms 8 and the OK-indicator lamp 7a are successively turned on by a 1-Hz signal.

After a cycle of turning-on operation is completed, terminal 16a of the D-type flip-flop circuit 16 generates an H-signal in response to an input pulse signal to the terminal 16c thereof, and thereby, terminal 23b of integrated circuits 23 is caused to have an L-signal. As a result, terminal 23d of integrated circuits 23 is caused to generate an H-signal, and the clock pulse generator 11 resumes generation of 5/2-Hz clock pulses. Thus, all of the outputs of the demultiplexor 10 become L-signals.

In FIG. 2, the character $V_0$ designates the voltage of a battery power supply, and the character V designates a constant voltage transformed from the voltage $V_0$ shown as an H-level signal or an H-signal in this specification. The grounded side is at 0 volt, which is shown as an L-level signal or an L-signal. The voltages V and $V_0$ are applied to the above-mentioned circuits when the engine key 4 is in the ON position.

In the above-mentioned preferred embodiment of the present invention, the main alarm device 6 is provided with the red lamp 6a as the warning signal. However, a buzzer may be used instead of the lamp 6a.

It will be understood from the foregoing description that the centralized alarm system of the present invention has the following features, advantages and effects:

The various indicators, etc. of the indicating section can be provided in a display window and can therefore be made very compact. Consequently, the system of the present invention can be installed at a position which is very easy for the driver to see and therefore no oversight is likely to occur.

Only the main alarm lamp is turned on when one or a plurality of troubles occur in the vehicle during the starting and travelling thereof. Therefore, the driver can become aware of the alarm very easily without difficulty. The main alarm only is turned on first when any trouble occurs. If, in this condition, the check switch is depressed, an abnormal part or parts can become easily known to the operator of the vehicle. Even if a plurality of abnormal parts occur, they are successively indicated and can therefore be easily identified.

After completion of a cycle of successive operations of indicating abnormal parts, only the main alarm lamp is again turned on. Thus, the system of the present invention is simpler in operation than the conventional device in which abnormality-indicating lamps corresponding to abnormal parts are always kept lit and require a turning off operation in most cases.

The indicating lamps of various alarm devices flicker when giving warning. Therefore, the warning is easily perceived and has no possibility of being overlooked. Depending upon the kind of vehicle, the main alarm lamp can be provided at a position which is most easy to see independently of other alarm lamps. Thus, the centralized alarm system itself can be installed at a most suitable position. The OK-indicator lamp is turned on if no abnormality is found when the engine is started. In addition, if the check switch is depressed, the inspected parts can be successively known and then the OK-indicator lamp is again turned on. Thus, the inspected parts can be easily known by only one switching operation, and the lighting of the OK-indicator gives the driver a sense of reassurance.

Whether or not the OK-indicator lamp is lit may be confirmed once the engine is started. Therefore, if the OK-indicator lamp is designed so that it may be turned off at a predetermined time by the use of a timer, the possibility of misreading will be eliminated even if the OK-indicator and the main alarm are provided in one window.

When the engine starts, the main alarm lamp is first turned on to ensure that the indicating devices are functioning properly. Thus, the abnormal indicating devices can also be found. Accordingly, the present invention is very useful from the standpoint of practical use and safety.

In FIG. 3a, a display unit for the device is shown, having a plurality of stacked indicator plates in the form of glass or lucite 8a to 8f, with indicator lamps 8A to 8F. These may be provided at a convenient location out of the direct sight of the driver but still convenient to his view.

FIG. 3b shows an embodiment wherein the OK-indicator 7 and the main alarm indicator 6 are provided separately of the local indicators 8. The OK-indicator and main indicator 7 and 6, respectively, may be provided in the direct view of the driver, and the local indicators 8 may be provided off to the side or at another convenient location.

FIG. 3c shows an embodiment of the invention wherein all of the indicators are provided in a single box which is compartmentalized with each compartment including one of the local indicators 8, the main indicator 6 or the OK-indicator 7.

While specific embodiments of the invention have been shown and described in detail to illustrate the application of the principles of the invention, it will be understood that the invention may be embodied otherwise without departing from such principles.

What is claimed is:

1. A centralized alarm system for vehicles, having sensors provided on various parts of the vehicle for detecting the conditions of said parts, comprising, a control section for controlling signals generated from said sensors, an indicating section for indicating the conditions of said parts according to signals generated from said control section, a main alarm device connected to said control section, local alarm devices corresponding to said parts to be inspected connected to said control section, a check switch, connected to said control section, and a circuit in said control section adapted to give said control section a command for indicating abnormal parts in response to a signal produced when said check switch is closed, said circuit including means so that when one or a plurality of said parts are detected to be abnormal, said main alarm device is first turned on and then the parts found to be abnormal are indicated by the closing of said check switch.

2. A centralized alarm system for vehicles, as claimed in claim 1, wherein said main alarm device and said local alarm devices are provided collectively in one indicating window.

3. A centralized alarm system for vehicles, as claimed in claim 1, wherein said main alarm device is provided at a position in front of a driver seat in a vehicle which is most easy to see and, wherein, said local alarm devices are provided separately from said main alarm device.

4. A central alarm system for vehicles, as claimed in claim 1, including means wherein, when an engine key in the vehicle is operated to activate said circuit, the main alarm device is made to operate after checking for the proper functioning of said main alarm device.

5. A centralized alarm system for vehicles, as claimed in claim 1, including means wherein the parts found to be abnormal are successively indicated when the check switch is closed.

6. A centralized alarm system for vehicles, as claimed in claim 5, wherein said main and local alarm devices comprise lamps and said circuit includes means so that when the check switch is closed, the abnormal parts are successivley indicated by flickering the lamps of the corresponding local alarm devices a plurality of time each.

7. A centralized alarm system for vehicles, as claimed in claim 1, wherein the circuit includes means so that when the check switch is closed, the parts found to be abnormal are indicated successivley at least once, and then the main alarm device is again turned on.

8. A centralized alarm system for vehicles, as claimed in claim 1, wherein, when an engine key in the vehicle is operated, the main alarm device is made to operate after checking whether the main alarm device is functioning properly.

9. A centralized alarm system for vehicles, having sensors provided on various parts of a vehicle for detecting the conditions of said parts, a control section for controlling signals generated from said sensors, and an indicating section for indicating the conditions of said parts according to signals generated from said control section, comprising, a main alarm device, local alarm devices corresponding to said parts to be inspected, an OK-indicator, a check switch, a circuit adapted to give said control section a command for indicating abnormal parts or for indicating the parts to be inspected in response to a signal produced when the check switch is closed, said circuit having means so that when one or a plurality of said parts are detected to be functioning abnormally, the main alarm device is turned on first and then the parts found to be abnormal are indicated by manually closing said check switch, and so that, when no abnormal part is detected, the OK-indicator is turned on and the inspected parts are indicated by the manual closing of said check switch.

10. A centralized alarm system for vehicles, as claimed in claim 9, wherein the parts found to be abnormal are successively indicated when the check switch is closed.

11. A centralized alarm system for vehicles, as claimed in claim 9, wherein, when the check switch is closed, the abnormal parts are successively indicated by the flickering, a plurality of times, of each of the lamps of the corresponding local alarm devices of the abnormal parts.

12. A centralized alarm system for vehicles, as claimed in claim 9, wherein, when the check switch is closed, the parts found to be abnormal are successively indicated at least once and then the main alarm device is again turned on.

13. A centralized alarm system for vehicles, as claimed in claim 9, wherein, when no abnormal part is detected, the inspected parts are successively indicated by closing the check switch.

14. A centralized alarm system for vehicles, as claimed in claim 9, wherein, when no abnormal part is detected, and said check switch is closed, the inspected parts are successively indicated at least once, and the OK-indicator is then again turned on.

15. A centralized alarm system for vehicles, as claimed in claim 9, wherein, when no abnormal part is detected and the check switch is closed, the inspected parts are successively indicated at least once, and the OK-indicator is then again turnd on and kept lit for a predetermined period.

16. A centralized alarm system for vehicles, as claimed in claim 9, wherein, when no abnormal part is detected, said OK-indicator stays lit for a predetermined period only when the engine key is being operated.

17. A centralized alarm system for vehicles, as claimed in claim 16, wherein, when no abnormal part is detected and the check switch is closed, the inspected parts are successively indicated at least once each.

18. A centralized alarm system for vehicles, as claimed in claim 16, wherein, when no abnormal part is detected and the check switch is closed, the inspected parts are successively indicated at least once and the OK-indicator is again turned on and kept lit for only a predetermined period.

19. A centralized alarm system for vehicles, as claimed in claim 9, wherein, when an engine key in the vehicle is operated, or said OK-indicator is operated after checking if said main alarm device is functioning properly.

20. A centralized alarm system for vehicles, having sensors provided on various parts of the vehicle for detecting the conditions of said parts, a control section for controlling signals generated from said sensors, and an indicating section for indicating the conditions of said parts according to signals generated from said control section, said indicating section being provided in one indicated window, and comprising, a main alarm lamp device, local alarm lamp devices corresponding to the parts to be inspected, an OK-indicator, said main and local alarm lamp devices and said OK-indicator being provided collectively in one indicating window, a check switch, a circuit adapted to give said control section a command for indicating abnormal parts or for indicating the inspected parts in response to a signal produced when said check switch is closed, and means in said circuit so that when one or a plurality of said parts are detected to be abnormal, the main alarm lamp device is first turned on and the abnormal parts are indicated when said check switch is manually closed, and wherein, when no abnormal part is detected, the OK-indiator is first turned on and the inspected parts are indicated when the check switch is manually closed.

21. A centralized alarm system for vehicles, as claimed in claim 20, wherein the abnormal parts are successively indicated when the check switch is closed.

22. A centralized alarm system for vehicles, as claimed in claim 21, in which, when the switch is closed, the abnormal parts are successively indicated by flickering the lamps of said local alarm devices corresponding to said abnormal parts a plurality of times.

23. A centralized alarm system for vehicles, as claimed in claim 20, wherein, when the check switch is closed, the abnormal parts are successively indicated, and the main alarm device is again turned on.

24. A centralized alarm system for vehicles, as claimed in claim 20, wherein, when no abnormal part is detected and the check switch is closed, the inspected parts are successively indicated.

25. A centralized alarm system for vehicles, as claimed in claim 20, wherein, when no abnormal part is detected and the check switch is closed, the inspected parts are successively indicated at least once, and the OK-indicator is again turned on.

26. A centralized alarm system for vehicles, as claimed in claim 20, wherein, when no abnormal part is detected and the check switch is closed, the inspected parts are successively indicated at least once, and the OK-indicator is again turned on and kept lit for only a predetermined period.

27. A centralized alarm system for vehicles, as claimed in claim 20, wherein, when no abnormal part is detected, the OK-indicator is lit for a predetermined time only when the engine key is being operated.

28. A centralized alarm system for vehicles, as claimed in claim 27, wherein, when no abnormal part is detected, and the check switch is closed, the inspected parts are successively indicated at least once.

29. A centralized alarm system for vehicles, as claimed in claim 27, wherein, when no abnormal part is detected and the check switch is closed, the inspected parts are successively indicated at least once, and the OK-indicator is again turned on and kept lit for only a predetermined time.

30. A centralized alarm system for vehicles, as claimed in claim 20, wherein, when the engine key is operated, the main alarm device or the OK-indicator is made to operate after checking for said main alarm device properly functioning.

31. A centralized alarm system for warning of abnormalities in a plurality of components, in particular for a vehicle, comprising, a plurality of sensors, each associated with a component for producing an abnormality signal when the associated signal becomes abnormal, a control circuit connected to each of said sensors for producing a main indication signal when any one of said sensors produces an abnormality signal and for producing a local indication signal for each sensor producing an abnormality signal, a plurality of local indicators, each associated with one of said sensors and connected to said control circuit, each being capable of producing a perceptable indication and a main indicator connected to said control circuit for producing a perceptable indication when a main indication signal is produced in said control circuit, said control circuit including system checking means connected to said main indicator for turning the main indicator on when a main indication signal is produced, and manual component checking means connected between said main indicator and said local indicators for individually turning said local indicators corresponding to sensors which have produced an abnormality signal on.

32. A centralized alarm system, as claimed in claim 31, wherein said component checking means includes a checking switch connected to said local and main indicators, a multiplexor connected between said check switch and said plurality of sensors, and a clock pulse generator connected to said multiplexor for scanning said multiplexor and selectively applying an abnormality signal from said sensors to said control circuit to form said local indication signals for selectively turning said local indicators on, and a demultiplexor connected between said multiplexor and said local indicators, said clock pulse generator connected to said demultiplexor.

33. A centralized alarm system, as claimed in claim 31, further including an OK-indicator connected to said control circuit, said control circuit including OK-indication means for turning said OK-indicator on when no abnormality signal is produced by said sensors.

34. A centralized alarm system, as claimed in claim 33, wherein said OK-indicator and said mainindicator are mounted in a first cluster in the direct view of an operator of the vehicle and said local indicators are mounted in a separate cluster out of the direct view of the operator.

35. A centralized alarm system, as claimed in claim 34, wherein each of said clusters comprises a plurality of superposed transparent panels with a bulb for lighting each panel separately.

36. A centralized alarm system, as claimed in claim 33, wherein each of said main, OK- and local indicators is mounted adjacent each other in a viewing window.

37. A centralized alarm system, as claimed in claim 31, wherein said control circuit includes a signal processor connected to each of said sensors for producing said abnormality signal, and a holding circuit connected to at least some of said signal processors for maintaining an abnormality signal, said sensors comprising voltage variation sensors for varying a voltage applied to said signal processors when an abnormality occurs in an associated component.

38. A centralized alarm system, as claimed in claim 33, wherein said system checking means includes means for turning said main indicator on, means for extinguishing said main indicator after a selected period of time if no abnormality signal is produced by said sensors, and means for momentarily turning said OK-indicator on when no abnormality signal is produced by said sensors.

39. A centralized alarm system, as claimed in claim 38, wherein the vehicle includes an engine switch connected to said control circuit, said system checking means being activated by the activation of said engine switch.

40. A centralized alarm system, as claimed in claim 37, wherein said control circuit includes means for cancelling an abnormality signal of sensors which do not have said holding circuit when the abnormality is corrected, said sensors with holding circuits maintaining the abnormality signals even when the abnormality is corrected.

41. A centralized alarm system, as claimed in claim 35, wherein each of said bulbs is positioned at the edge of each of said panel respectively so that only a panel having a lit bulb is visible.

42. A centralized alarm system, as claimed in claim 36, wherein each of said main, OK and local indicators includes a bulb in a separate compartment, whereby only an indication corresponding to a lit one of said bulbs is viewed in said viewing window.

* * * * *